United States Patent
Pallot et al.

(10) Patent No.: US 9,511,557 B2
(45) Date of Patent: Dec. 6, 2016

(54) METHOD AND DEVICE FOR MAKING BLIND GROOVES IN AN UNVULCANIZED TREAD

(75) Inventors: Patrick Pallot, Clermont-Ferrand (FR); Gerard Crosnier, Ceyrat (FR); Richard Abinal, Veyre-Monton (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1425 days.

(21) Appl. No.: 13/256,210

(22) PCT Filed: Mar. 8, 2010

(86) PCT No.: PCT/EP2010/052899
§ 371 (c)(1),
(2), (4) Date: Feb. 29, 2012

(87) PCT Pub. No.: WO2010/102975
PCT Pub. Date: Sep. 16, 2010

(65) Prior Publication Data
US 2012/0145334 A1   Jun. 14, 2012

(30) Foreign Application Priority Data
Mar. 11, 2009   (FR) .................................. 09 51516

(51) Int. Cl.
  *B29D 30/68*   (2006.01)
  *B29D 30/52*   (2006.01)
(Continued)

(52) U.S. Cl.
  CPC ............... *B29D 30/52* (2013.01); *B26D 3/003* (2013.01); *B26D 7/10* (2013.01); *B26F 1/20* (2013.01); *B29D 30/68* (2013.01)

(58) Field of Classification Search
  CPC ............ B29D 30/52; B29D 30/68; B26F 1/20; B26D 7/10; B26D 3/003
(Continued)

(56) References Cited

U.S. PATENT DOCUMENTS 2,232,488 A     2/1941  Smith
2,907,365 A  *  10/1959 MacDonald ........ B60C 11/0309
                                                      152/209.6
(Continued)

FOREIGN PATENT DOCUMENTS

DE        196 54 408      6/1998
DE    10 2005 061 092     6/2007
(Continued)

*Primary Examiner* — Hadi Shakeri
(74) *Attorney, Agent, or Firm* — Cozen O'Connor

(57) ABSTRACT

Method of manufacturing a tire comprising a tread strip in which blind radial cuts are arranged in the blocks of rubber that form the tread pattern, comprising a step during which the cuts (33) are made in the unvulcanized tread strip (3) intended to cap the green tire. One or more blades (22) are raised to a temperature higher than the vulcanization temperature of the material of which the tread strip (3) is made are caused to penetrate the radially internal face (32) of the tread strip (3) for a sufficient period of time that they superficially vulcanize the walls of the cut in contact with the blade (22) so as to prevent the faces from sticking back together once the blade has been withdrawn from the cut.

10 Claims, 1 Drawing Sheet

(51) Int. Cl.
*B26D 3/00* (2006.01)
*B26D 7/10* (2006.01)
*B26F 1/20* (2006.01)

(58) Field of Classification Search
USPC .......................................................... 157/13
See application file for complete search history.

(56) References Cited

U.S. PATENT DOCUMENTS

| | | | |
|---|---|---|---|
| 3,491,651 A | | 1/1970 | Pascoe |
| 3,589,427 A | * | 6/1971 | Love ..................... B29D 30/68 157/13 |
| 3,683,728 A | * | 8/1972 | Meserve ................ B29D 30/68 157/13 |
| 3,753,821 A | * | 8/1973 | Ragen .................... B29D 30/56 156/129 |
| 4,080,230 A | | 3/1978 | Batchelor et al. |
| 5,265,506 A | | 11/1993 | Aihara et al. |
| 5,642,646 A | | 7/1997 | Aihara |
| 6,098,511 A | | 8/2000 | Röthemeyer |
| 8,900,386 B2 | * | 12/2014 | Neroni ................... B29D 30/56 152/209.6 |
| 9,044,909 B2 | * | 6/2015 | Lelio .................. B29D 30/3007 |

FOREIGN PATENT DOCUMENTS

| | | | |
|---|---|---|---|
| DE | 10 2006 038 742 | | 2/2008 |
| DE | 102006036509 | | 2/2008 |
| EP | 335694 | | 10/1989 |
| FR | 2 728 498 | | 6/1996 |
| JP | H 04113905 | | 4/1992 |
| JP | H 11147403 | | 6/1999 |
| JP | 2006142557 A | * | 6/2006 |

* cited by examiner

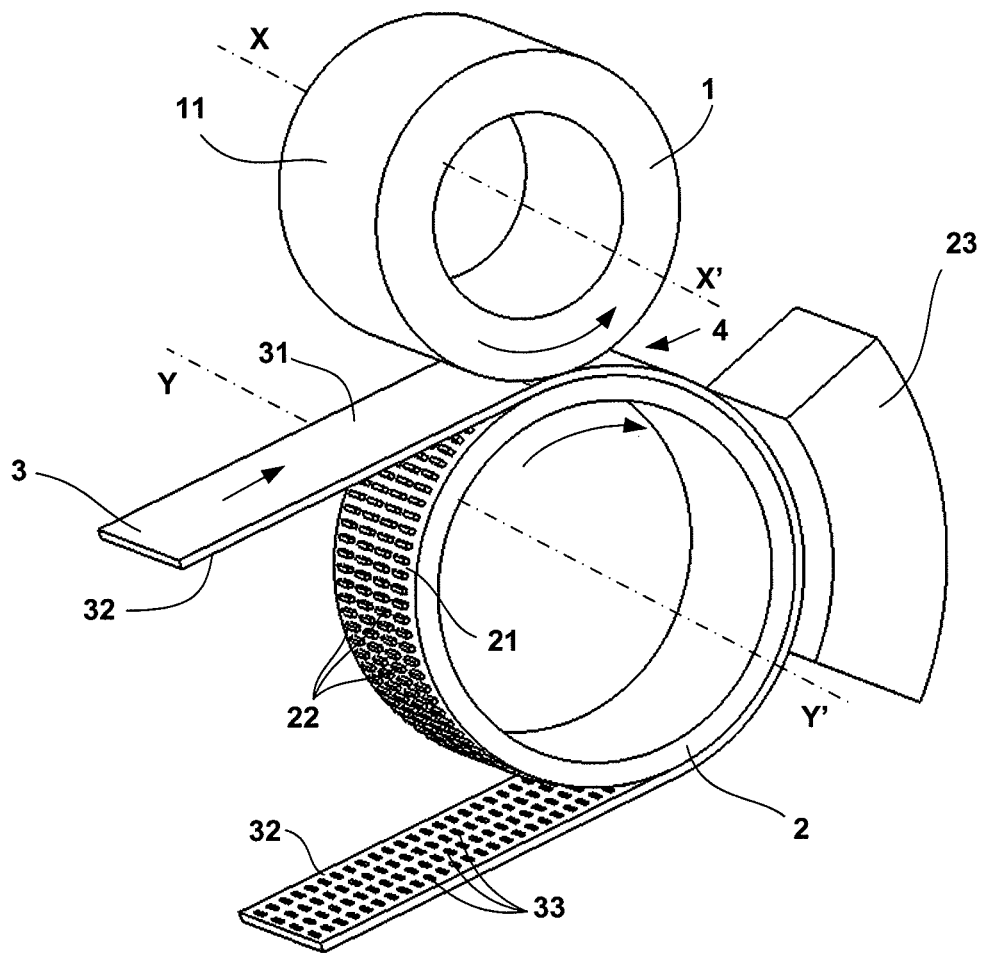

METHOD AND DEVICE FOR MAKING BLIND GROOVES IN AN UNVULCANIZED TREAD

RELATED APPLICATION

This is a U.S. National Phase Application under 35 USC §371 of International Application PCT/EP2010/052899, filed on Mar. 8, 2010.

This application claims the priority of French patent application no. 09/51516 filed Mar. 11, 2009, the entire content of which is hereby incorporated by reference.

FIELD OF THE INVENTION

The field of the invention is that of the manufacture of tires and, more particularly, that of the production of tread strips.

BACKGROUND OF THE INVENTION

As is known, tire tread strips comprise sculpted patterns on their radially external surface, with a view to improving the road_holding of the tires on surfaces of different natures. Thus, in general, the tread pattern has grooves directed in the circumferential direction, transverse grooves, and blocks of tread patterns comprising cuts. One of the purposes of these cuts is to provide the tire with better grip on wet ground.

The array of cuts is obtained by arranging a corresponding array of siping blades in the curing mould. These cuts, of a given depth, known as external or open-ended cuts, are produced during the moulding operation and extend radially from the radially external surface of the tread strip towards the inside of the tread strip.

However, it is found that the effectiveness of the external cuts decreases as the tire tread blocks become worn, because of the relative reduction in depth of the said external cuts.

In addition it has been proposed that cuts be made that extend radially over a given height from the radially internal face of the tread strip and which are arranged in line with the blocks of rubber. The height of these internal cuts is determined in such a way that the said internal or blind cuts do not communicate with the radially external face of the tread strip when the tire is not worn. When the blocks have reached a certain level of wear, the external cuts appear at the surface of the tread strip in order to give the tire additional grip until such time as the tread strip is fully worn.

By way of example, publication EP 335 694 describes a tread strip comprising internal cuts made radially from the internal surface of the tread strip.

Numerous publications cover how to produce these internal cuts.

Publication JP 11 147 403 proposes the use of inserts made of a material that has a resistance to wear inferior to that of the tread strip and which, following partial wear, opens onto the radially external surface of the tread strip.

Publication JP 04 113 905 proposes making the internal cuts in a pre-cured tread strip. The tread strip thus modified is then applied to the radially external surface of the tire, generally following a re-treading operation.

Publication DE 10 2006 036 509 describes a method in which the internal cuts are made in an unvulcanized tread strip. A non-stick material is introduced into the cuts to prevent the said cuts from closing up during the vulcanizing operation.

Thus, the problems that arise when internal cuts are to be made in an unvulcanized tread strip and the latter is then to be applied to the green tire during the final phase of tire building, are of two kinds: a first problem, as was seen above, is that of preventing the faces of the cuts from welding themselves back together again during tire vulcanization. The second problem is in the positioning of the internal cuts such that they lie in line with the blocks of the tread pattern, because steps are taken to avoid the internal cuts opening into the bottoms of the circumferential or transverse grooves.

SUMMARY OF THE INVENTION

It is an object of the invention to provide a solution to both of these problems.

According to one aspect of the invention directed to a method of manufacturing a tire comprising a tread strip in which blind radial cuts are arranged in the blocks of rubber that form the tread pattern, the method comprises a step during which the cuts are made in the unvulcanized tread strip intended to cap the green tire.

This step is characterized in that one or more blades raised to a temperature higher than the vulcanization temperature of the material of which the said tread strip is made are caused to penetrate the radially internal face of the said tread strip for a sufficient period of time that they superficially vulcanize the walls of the cut in contact with the said blade so as to prevent the faces from sticking back together once the blade has been withdrawn from the cut.

By suitably adjusting the temperature of the blades and the time during which the blade penetrates the cut, it is possible to ensure that the two faces of each of the internal cuts experience superficial vulcanization preventing the faces from sticking back together.

It has therefore been found that, during the step of vulcanizing and moulding the tread strip, the cuts positioned in line with the blocks of the tread pattern have faces that do not weld back together again and that cuts positioned in line with a groove or external cut disappear.

This phenomenon is the result of the fact that the regions of the tread strip that are positioned in line with the grooves or sipes intended to create the external cuts are regions in which the material is subject to significant levels of movement during the moulding phase. This causes the faces of the cut to become dislocated with the result that rubber bonds are reformed during vulcanizing.

By contrast, cuts positioned in line with the tread blocks do not experience such disturbances, and this means that a tire can be created that comprises internal cuts the faces of which are not vulcanized, and which extend radially from the root of the tread strip towards the radially external surface of the tire, without coming flush with the said radially external surface.

It will be noted that the choice of the temperature of the heating blades and of the time during which the said heating blades penetrate the tread strip are of decisive importance in revealing the abovementioned phenomenon. Specifically, the pre-vulcanizing of the faces of the cut needs to be essentially superficial without affecting the layers of material distant from the said faces of the cut.

Another object of the invention is to provide a device suitable for implementing a method according to the invention.

Devices for making cuts in a continuous strip are widely known and, as a general rule, comprise a first means having a first surface intended to support the radially outer face of the tread strip, and a second means having a second surface intended to come into contact with the radially internal face of the tread strip and on which there is arranged an array of blades positioned facing the first surface and intended to penetrate the said tread strip. The first and the second surface are able to collaborate in such a way that, when the device is in operation, the blades penetrate the tread strip.

In a known way, these devices comprise means which allow the blades to be heated in such a way as to improve their penetration into the rubbery material of which the tread strip is formed. These means, are, as a general rule, formed of resistive electrical elements placed in contact with the base of the blades.

However, steps should be taken to avoid the heating devices interfering in an undesirable way with the other parts of the tread strip. In particular, steps should be taken to ensure that the second surface in contact with the root of the tread strip is not raised to a temperature likely to cause the said root to become vulcanized. It will be noted that the traditional means also have the effect of raising the second surface to an excessive temperature.

It is an object of the invention to provide a solution to this second problem.

To this end, the device for making cuts according to an embodiment of the present invention comprises blades made of a material with ferromagnetic properties and an induction device that has an effect only on the blades penetrating the cuts.

As a result, the application of heat energy can be controlled accurately by adjusting the accuracy of the inductors, and also the blades positioned outside of the field of influence of the inductor cool down.

Through a suitable choice of the material from which to make the second means, such as a material that is non-magnetic and a weak conductor of heat, an increase in temperature of the second surface can be avoided.

In addition, when the second surface is of cylindrical shape, only a portion of the circumference of the second surface is in contact with the root of the tread strip. All that is then required is to design an inductor that acts on just this portion so that only the blades that have penetrated the tread strip will be brought up to temperature. The blades situated on the complementary portion of the circumference are no longer subject to the action of the inductor and can therefore cool down.

BRIEF DESCRIPTION OF THE SINGLE DRAWING

FIG. 1 shows a preferred embodiment of the invention.

DETAILED DESCRIPTION OF THE SINGLE DRAWING

The device depicted in FIG. 1 comprises a first means 1 of cylindrical overall shape, rotating about an axis XX'.

The second means 2 is also formed of a cylinder rotating about its axis YY'.

The radially external surfaces of each of the cylinders respectively form the first surface 11 and the second surface 21. The second surface 21 comprises an array of blades 22 extending substantially in the radial direction. The circumferential speeds of the cylinder 1 and of the cylinder 2 are the same and in opposite directions. The first and second surfaces form a nip 4 through which, when the device is operating, a tread strip 3 passes.

In this preferred embodiment of the invention, the heating means 23 is formed of a set of induction coils positioned in line with a portion of the circumference of the cylinder 2, and placed downstream of the nip 4. The blades are made of a ferromagnetic material. By contrast, the material that forms the body of the cylinder 2 and the second surface 21, has no ferromagnetic property and will preferably be a weak conductor of heat.

At the nip 4, the radially external face 31 of the tread strip is in contact with the first surface 11, and the radially internal face 32 of the tread strip is in contact with the second surface 21. This means that the blades 22 penetrate the radially internal face 32 of the tread strip 3.

Steps are then taken to keep the tread strip in contact with the second face 21 over part of the circumference of the cylinder 2 downstream of the nip 4. To do this, guide bar means (not depicted) are provided to guide the tread strip upstream and downstream of the device according to the invention.

By adjusting the circumferential speed of the cylinder 2 and the length of the portion of circumference over which the blades 22 are kept embedded in the tread strip, the time of contact between the blades 22 and the faces of the cuts 33 directly in contact with the said blades is determined.

The blades 22 are raised to a temperature higher than the vulcanizing temperature of the material of which the tread strip 3 is made and comprised substantially between 170° C. and 250° C. Too low a blade temperature would result in a long contact time. Conversely, too high a temperature could destroy the material and lead to an advanced stage of vulcanization of the faces of the cut in contact with the said blades which, as was explained hereinabove, is detrimental to the recomposition of the compound in line with the ribs and siping blades intended respectively to mould the grooves and the external cuts in the tread strip.

Experimentally, for a tread strip intended for a passenger car, good results have been obtained with a device comprising a second means forming a roller 2 of a diameter of 1.5 m, rotated at a circumferential speed of 3 m/minute, and comprising blades raised to a temperature of 220° C. In this configuration, when the tread strip is wound over half the circumference of the cylindrical roller 2, the blades remain in contact with the faces of the cut for a time of the order of 30 seconds.

When the temperature of the blades is reduced to 180° C., it is necessary to reduce the circumferential speed of the roller 2 to 0.4 m/minute. The blades then remain in contact with the faces of the cut for a time of 3 minutes.

In practice, the blade penetration time is comprised between 0.3 min and 5 minutes and the higher the temperature, the shorter is this time.

The embodiment of the invention as described hereinabove can be varied in a great many ways that yield equivalent results.

Thus, the second means may adopt the form of a conveyor belt running between two rollers. In this embodiment, the first means may have the form of a cylindrical roller as described hereinabove, or of a conveyor belt facing the conveyor belt forming the second means.

Another form of embodiment that necessitates a large number of inductors involves arranging a portion of tread strip on a fixed second surface comprising an array of blades. The blades are embedded in the radially internal face of the tread strip using a first means such as a roller.

The invention claimed is:

1. A method of manufacturing a tire comprising a tread strip in which blind radial cuts are arranged in blocks of rubber that form a tread pattern, comprising:

inserting a plurality of blades into a portion of an internal face of an unvulcanized tread strip intended to cap a green tire so that the plurality of blades to form a plurality of cuts which do not penetrate fully through the unvulcanized tread strip;

heating a portion of the plurality of blades and a portion of the tread strip into which a portion of the plurality of the plurality of blades have penetrated to a temperature higher than a vulcanization temperature of the tread strip while the portion of the plurality of blades have penetrated the tread strip for a sufficient period of time so that the portion of the plurality of blades superficially vulcanize walls of the plurality of cuts in the tread strip made by the blades; and allowing the tread strip to at least partially cool after heating, with the portion of the plurality of blades remaining penetrated in the tread strip.

2. The method of claim 1, wherein the portion of the plurality of blades are heated to a temperature of between 170° C. and 250° C.

3. The method of claim 2, wherein the plurality of blades remain penetrated in the tread strip during heating between 0.3 minutes and 5 minutes.

4. The method of claim 1, wherein the blades are made to penetrate the unvulcanized tread strip in a substantially radial direction.

5. The method of claim 1, further comprising:
applying a portion of the tread strip after the tread strip has at least partially cooled to a green tire; and
subsequently vulcanizing the green tire with the applied tread strip and simultaneously pressing the tread strip onto the green tire in a curing press.

6. A device for making internal cuts in an unvulcanized tread strip, comprising:
a first cylinder having a first surface adapted to contact a portion of a radially outer face of the unvulcanized tread strip,
a second cylinder having a second surface adapted to contact a portion of a radially internal face of the unvulcanized tread strip, the second surface having arranged thereon an array of blades directed toward the radially internal face of said unvulcanized tread strip, the first surface and the second surface being positioned so that, at least along a line where the first surface initially contacts the radially outer face of the unvulcanized tread strip, the blades on the second surface penetrate the radially internal face of the unvulcanized tread strip without penetrating fully through the unvulcanized tread strip, wherein the blades are made of a heat conductive material that has ferromagnetic properties, and wherein the second surface is made of a non-magnetic material that is a weak conductor of heat; and
an induction heater positioned and shaped to heat a portion of the unvulcanized tread strip and a plurality, but not all of the blades to a given temperature after the plurality of blades have penetrated the radially internal face of the unvulcanized tread strip.

7. The device of claim 6, wherein the blades are configured to extend substantially perpendicular to the second surface.

8. The device of claim 6, wherein the first cylinder and the second cylinder are cylindrical rollers with parallel axes, between which cylinders said unvulcanized tread strip passes.

9. The device of claim 8, wherein the induction heater is positioned so as to heat at least a portion of a circumference of the cylindrical roller of the second cylinder where the blades have penetrated the tread strip.

10. The device of claim 9, wherein the induction heater is positioned and shaped so that a portion of the tread strip with a plurality of blades penetrated therein are not heated after the plurality of blades and the portion of the tread strip have been heated to allow the plurality of blades that have penetrated into the portion of the tread strip and have been heated, and the portion of the tread strip that has been heated, to cool, after being heated, with the plurality of blades remaining penetrated into the portion of the tread strip.

* * * * *